(12) United States Patent
Jin

(10) Patent No.: US 6,904,597 B2
(45) Date of Patent: Jun. 7, 2005

(54) INTER-THREAD COMMUNICATIONS BETWEEN DIFFERENT COMPONENTS USING DOUBLE BUFFER

(75) Inventor: Bin Jin, Randolph, NJ (US)

(73) Assignee: Intel Corporation, Santa Clara, CA (US)

(*) Notice: Subject to any disclaimer, the term of this patent is extended or adjusted under 35 U.S.C. 154(b) by 587 days.

(21) Appl. No.: 09/820,756

(22) Filed: Mar. 30, 2001

(65) Prior Publication Data

US 2002/0144003 A1 Oct. 3, 2002

(51) Int. Cl.[7] ............................................. G06F 3/00
(52) U.S. Cl. ..................... 719/314; 719/312; 719/313; 719/318; 719/319; 719/329; 719/330
(58) Field of Search ........................... 719/312, 313, 719/314, 318, 319, 329, 330; 709/310–340

(56) References Cited

U.S. PATENT DOCUMENTS

| | | | | |
|---|---|---|---|---|
| 5,630,074 A | * | 5/1997 | Beltran | 709/314 |
| 5,640,604 A | * | 6/1997 | Hirano | 710/56 |
| 5,862,403 A | * | 1/1999 | Kanai et al. | 710/6 |
| 5,872,909 A | * | 2/1999 | Wilner et al. | 714/38 |
| 5,881,286 A | * | 3/1999 | Kougiouris et al. | 719/312 |
| 5,925,098 A | * | 7/1999 | Freund et al. | 709/203 |
| 6,131,126 A | * | 10/2000 | Kougiouris et al. | 709/330 |
| 6,658,490 B1 | * | 12/2003 | Williams et al. | 719/330 |

* cited by examiner

*Primary Examiner*—Nabil El-Hady
(74) *Attorney, Agent, or Firm*—Pillsbury Winthrop LLP

(57) ABSTRACT

An arrangement is provided for inter-thread communications. A first group of thread includes at least one thread. A thread from the first group buffers a request in a first buffer. A thread from a second group of thread retrieves the request buffered in the first buffer. The thread from the second group performs an operation based on the request and generates a response. The thread from the second group buffers the response in a second buffer. A thread from the first group of thread retrieves the response from the second buffer.

20 Claims, 5 Drawing Sheets

INTER-THREAD COMMUNICATIONS BETWEEN DIFFERENT COMPONENTS USING DOUBLE BUFFER

RESERVATION OF COPYRIGHT

This patent document contains information subject to copyright protection. The copyright owner has no objection to the facsimile reproduction by anyone of the patent document or the patent, as it appears in the U.S. Patent and Trademark Office files or records but otherwise reserves all copyright rights whatsoever.

BACKGROUND

Aspects of the present invention relate to multi-threading. Other aspects of the present invention relate to inter-thread communications.

Multithreading technologies have been widely used in various applications. Multithreaded applications often utilize software components from different vendors that, when forming a coherent application, need to communicate with each other. Such multithreaded applications require more sophisticated management due to the communication links between different threads.

The major issues in multithreading communications include properly allocating and utilizing shared memory as well as sending and receiving messages. Conventionally, inter-thread communications may be carried out through sending messages or receiving messages directly between the threads that are communicating. Such inter-thread communications may become particularly problematic when different threads are from different vendors that deal with different types of tasks. For example, graphical user interface software components from software vendors such as Microsoft may be substantially different, both in functionality as well as in software behavior, from a software component from a different vendor that deals with, for instance, modem connections.

In general, threads may be categorized into two groups: user interface threads and worker threads. The former usually handles user input and respond to both event and messages generated by the user. The latter are commonly used to complete low level library function calls (e.g., low level device interaction) that do not involve user intervention. Threads of these two categories carry out tasks of different nature and usually behave differently. For example, compared with a worker thread, a user interface thread exhausts a much greater amount of resource. In addition, a user interface thread usually has a more complicated structure. Due to these reasons, the processing time and the efficiency in resource usage of a user interface thread may differ significantly from that of a of a worker thread.

The difference in the above mentioned two categories of threads may introduce difficulties in designing multithreaded applications. Many existing multithreading applications use user interface threads to perform both user interfacing tasks and the tasks of a worker thread. Such multithreading applications, particularly large scale multithreading applications, are difficult to implement and to maintain.

Even when the two categories of threads are distinguished and implemented separately, the difference in these two categories of threads introduces difficulties in conducting effective inter-thread communications. Some existing multithreading applications utilize a single user interface thread to communicate with several worker threads. Such an arrangement may limit the multitasking capability of user interface and flexibility in a single user interface during inter-thread communications.

BRIEF DESCRIPTION OF THE DRAWINGS

The inventions presented herein are described in terms of specific exemplary embodiments which will be described in detail with reference to the drawings. These embodiments are non-limiting exemplary embodiments, in which like reference numerals represent similar parts throughout the several views of the drawings, and wherein.

DETAILED DESCRIPTION

Figure 1:
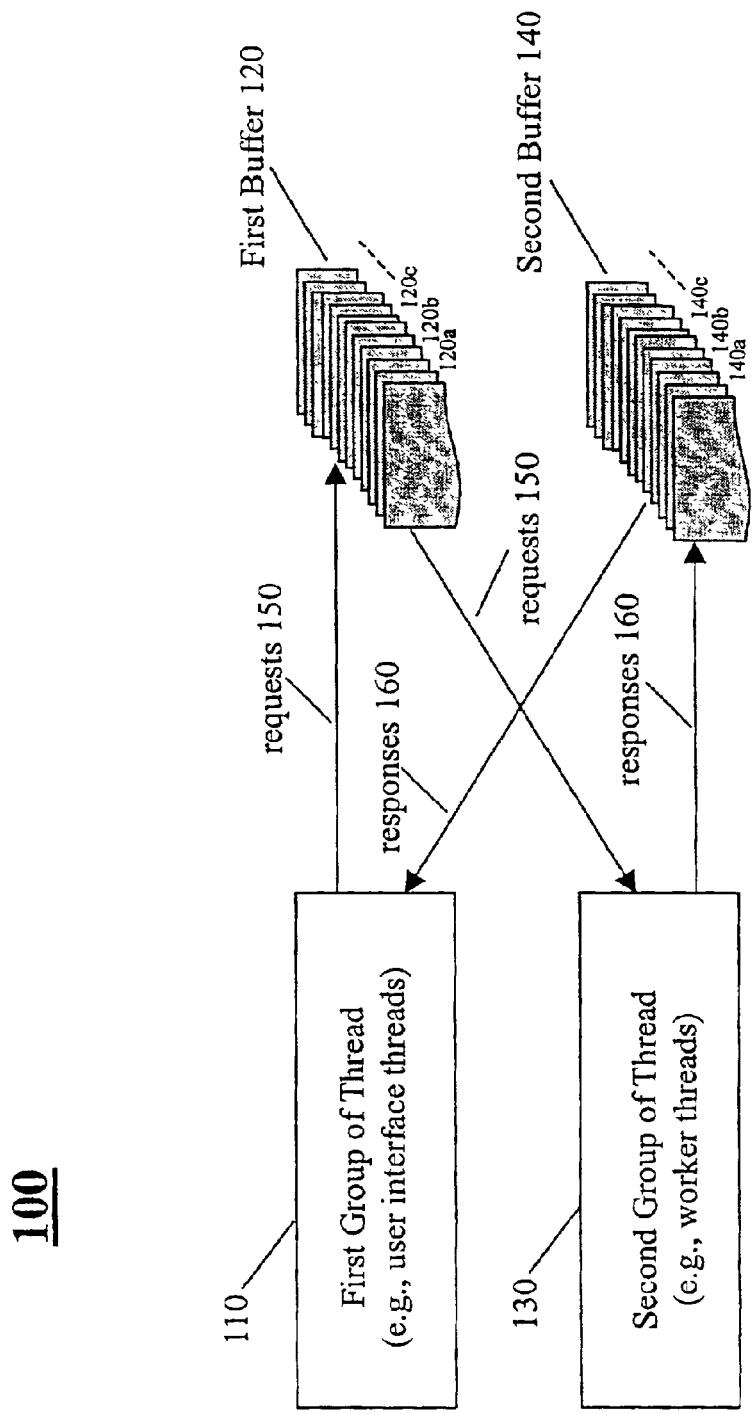
FIG. 1 depicts the high level architecture of the embodiments of the present invention.

FIG. 1 depicts the high level architecture of system 100 that is consistent with the embodiments of the present invention. In FIG. 1, system 100 comprises a first group of threads 110, a second group of thread 130, a first buffer 120, and a second buffer 140. The first group of threads 110 may include a plurality of threads that are similar in terms of the nature of the tasks they perform. For example, the first group of threads 110 may comprise user interface threads that perform user interface related tasks. For example, a user interface thread usually handles user input and responds to events and messages generated by a user. Such user interface threads may involve in general windows or Graphical User Interface (GUI) programming.

The second group of threads 130 may also comprise a plurality of threads. The threads in the second group 130 may be threads of service nature. That is, they provide services based on the requests from the threads from the first group. For example, the second group of threads 130 may comprise a set of worker threads. A worker thread is usually used to execute lower level processing tasks, including calling a library function or processing a message received from a piece of hardware. In general, a worker thread does not deal with user's input.

In FIG. 1, the first group of threads 110 and the second group of threads 130 correspond to different types of threads. The difference may be characterized by their functionality in terms of the tasks they perform, the complexity of the tasks they perform, and the time required performing such tasks. The division of the two groups of thread may also depend on particular applications. In a typical application in the field of telecommunication and networking, there may be two distinct groups of threads: a group of user interface threads and a group of worker threads. The former may be typically designed to handle tasks related to user interactions such as receiving commands from users or displaying messages in a window environment to the users. The latter may be typically designed to handle low-level device interactions such as library calls and event process.

Threads in a multithreading application may need to communicate. There are intra-thread communications. That is, the threads within a same group carry out intra-thread communications. There are inter-thread communications.

That is, the threads from different groups of thread carry out inter-thread communications. The present invention addresses the issues in inter-thread communications. Due to the difference between different groups, the inter-thread communications may pose special challenges.

Inter-thread communication may involve service requests. For example, assume a user interface thread accepts a command from a user to pin a device. In this case, the user interface thread, once it finishes the interaction with the user, may request a worker thread to perform what the user demands (e.g., to execute the pining on a specified device). The user interface thread communicates with a worker thread to pass on the command with possibly parameters (e.g., which device to pin on). The worker thread may analyze the command, configure the execution using the parameters, and then perform the pining on the specified device. If the device responds, it may send a message back to the worker thread (e.g., the message may indicate the speed achieved). In this case, the worker thread communicates with the user interface to indicate a successful connection with the device at the achieved speed.

To facilitate the communication between the two groups of thread 110 and 130 (inter-thread communication), a double buffering scheme is presented in FIG. 1 with a first buffer 120 and a second buffer 140. The first buffer 120 may comprise a plurality of buffer cells 120a, 120b, 120c, . . . . The first buffer 120 is used to buffer requests 150 issued by the threads in the first group of thread 110. Requests 150 may be accessed or retrieved by the threads in the second group 130.

The buffer cells in the first buffer 120 may be arranged in certain fashion. For example, they may simply form a circular linear linked list. For a list of buffer cells (as shown in FIG. 1) to form a circular linear linked list, the first buffer cell in the list is considered to be adjacent to the last cell in the list. One buffer cell in a circular linear linked list is considered to be the first or head of the list. The head of a circular linear linked list is movable. Each buffer cell in the first buffer 120 may be used to buffer one single request issued by a thread from the first group of thread 110 and the request may be buffered with data that is relevant to the request.

Requests 150 may be buffered in the first buffer 120 in certain order according to some criteria. For example, a first come and first serve policy may be applied. That is, a new request will be buffered in the first available or first free buffer cell. It is also possible that each request is buffered according to its priority. For example, a request with higher priority may be inserted into the first buffer 120 at an appropriate position so that the request may be processed in a timely fashion. Such priority may be determined according to the priority of the thread that generates or issues the request. It may also be determined according to the nature of the request.

The requests 150 buffered in the first buffer 120 are accessed and processed by the threads in the second group of thread 130. The threads from the second group 130 may access the requests 150 in certain fashion. For example, each thread in the second group may regularly examine the requests in the buffer cells of the first buffer 120 and picks up the request that is appropriate. Such appropriateness may be determined by identifying the recipient specified in the request. For example, a request may be specifically addressed to a particular thread in the second group so that only that particular thread may pick up and process the request. In this case, other threads in the second group 130, even though they may examine the request, may simply ignore the request.

A different scenario may be that a request in the first buffer can be picked up by any thread from the second group 130 that is capable of performing the operation that is being requested. In this case, any thread from the second group that has the capability to perform the requested operation may process the request.

The above described two scenarios may also co-exist. That is, some of the requests may indicate a designated thread to perform its operation. Some of the requests may simply specify the tasks to be performed and let the threads (from the second group) that examine the requests to decide whether it can further process the requests.

The threads from the second group 130 may generate responses 160 during the operations performed based on the requests 150. The responses 160 may include the results from the operations or the notifications about the status of the operations generated by the threads that perform the operations. The responses 160 may be communicated back to the threads of the first group 110. This is achieved via the second buffer 140.

Similar to the first buffer 120, the second buffer 140 may comprise a plurality of buffer cells 140a, 140b, 140c, . . . , which may be arranged in certain fashion such as a circular linear linked list. Responses 160 are buffered in the buffer cells in the second buffer 140 and may be accessed by the threads in the first group 110.

Individual threads in the first group 110 may examine the responses 160 buffered in the second buffer 130 and decide whether the responses are relevant. The relevance may be determined based on a recipient's identification. For example, assume a user interface thread from the first group issues a request to pin a particular device and a worker thread from the second group performs the pining, the worker thread generates the response information about the pining status and returns the response back to the user interface thread via the second buffer. In this case, the response about the pining status may be designated to the user interface thread that issues the pining request so that the response, in this case, can only be accessed by the user interface thread that issues the pining request.

Figure 2:
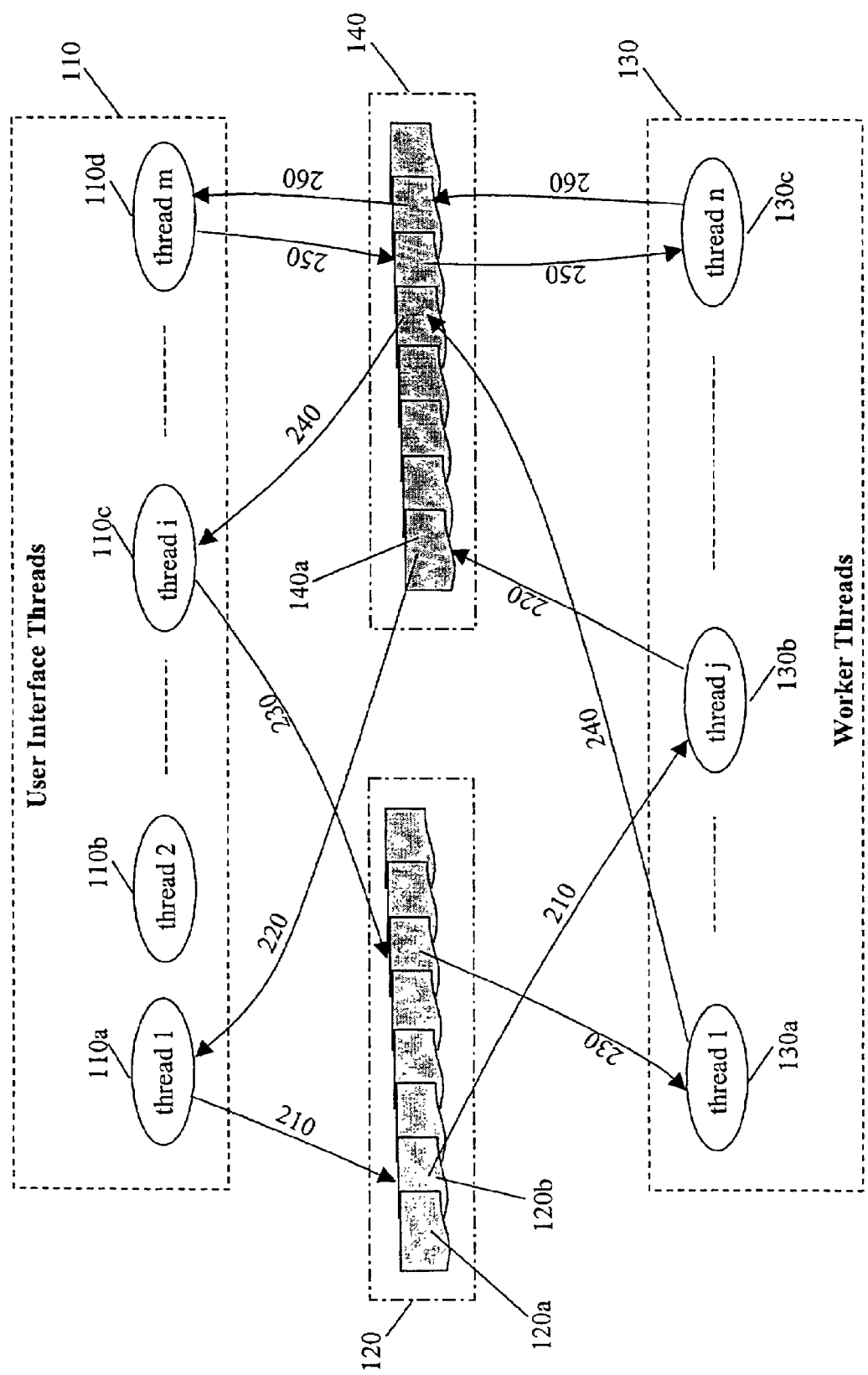
FIG. 2 describes the schematics of the embodiments of the present invention.

The above mentioned schematics are depicted in more detail in FIG. 2, in which expanded views of both groups of thread (110 and 130) and both buffers (120 and 140) as well as the information flow among these components are shown. In FIG. 2, the first group of thread 110 comprises m user interface threads (110a,110b, . . . ,110c, . . . ,110d) and the second group of thread 130 comprises n worker threads (130a, . . . ,130b, . . . ,130c). The user interface threads in the first group 110 and the worker threads in the second group 130 communicate via two buffers 120 and 140.

In the exemplary schematics shown in FIG. 2, a user interface thread 1, 110a, buffers a request 210 in buffer cell 120b in the first buffer 120. A worker thread j, 130b, in the second group 130 accesses the request 210 from the buffer cell 120b, processes the request 210, and performs the requested operation. During the operation, the worker thread j, 130b, generates a response 220 and sends the response 220 back to the user interface thread 130b via the buffer cell 140a in the second buffer 140. The user interface thread 110a then retrieves the response 220 from the buffer cell 140a. Similarly, user interface thread i, 110c, issues a request 230 in the first buffer 120 which is accessed and processed by a worker thread 1, 130a. The response 240, generated by the worker thread 130a, is then buffered in the second buffer and accessed by user interface thread 110c.

Figure 3:
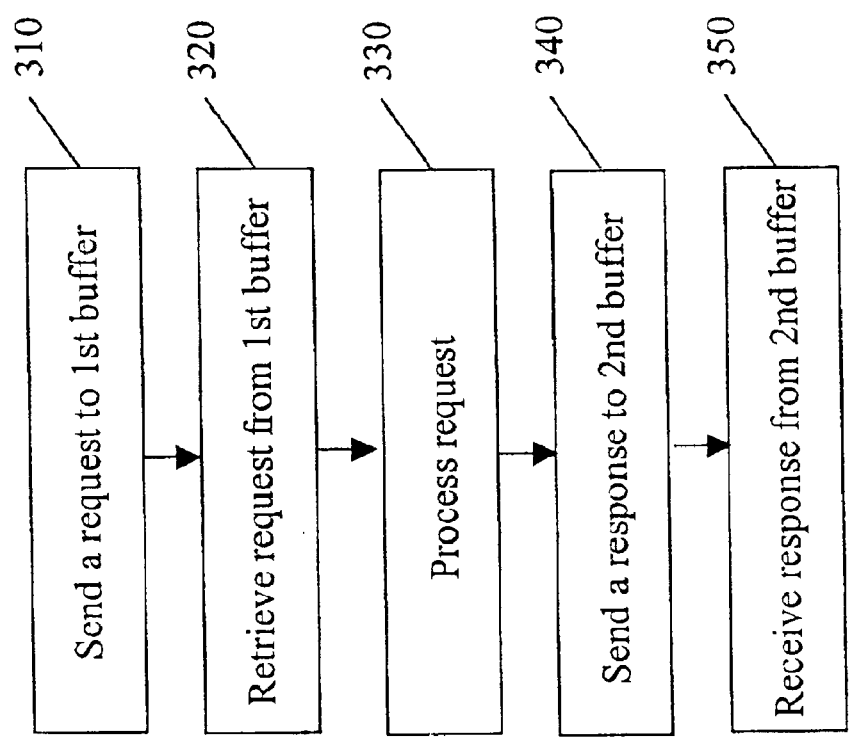
FIG. 3 is an exemplary flowchart of a process, in which multiple threads communicate via two buffers.

FIG. 3 is an exemplary flowchart of a process, in which inter-thread communication between two groups of thread is achieved via two buffers. A request is sent, at act 310, from a thread from the first group to the first buffer. The buffered request is retrieved or accessed, at act 320, by a thread from the second group of thread from the first buffer. The thread from the second group processes, at act 330, the retrieved request that may include to perform requested operations and to generate necessary responses to the request. Such response is sent, at act 340, from the thread from the second group to the second buffer, and then is received or picked up, at act 350, by a thread from the first group (which may be the thread that issues the request or a different thread).

Figure 4:
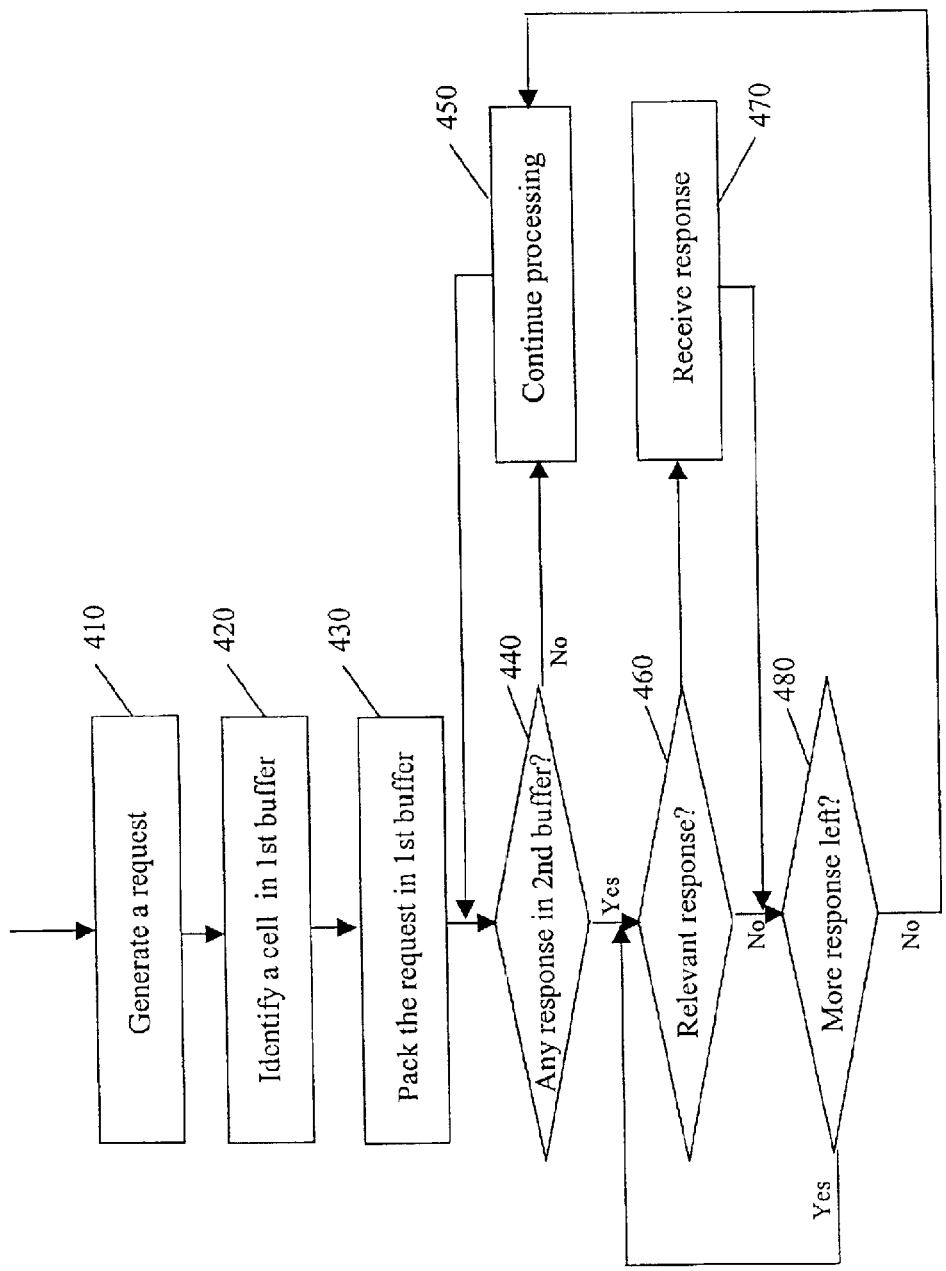
FIG. 4 is an exemplary flowchart of a user interface thread.

FIG. 4 is an exemplary flowchart of a process, in which a thread from the first group 110 communicates with a thread in the second group 130 via two buffers. A thread from the first group of thread 110 generates, at act 410, a request. To send the request to the second group of thread, the thread from the first group identifies, at act 420, an available buffer cell in the first buffer 120. Certain criteria may apply during identifying the available buffer cell. Such criteria may be determined according to application needs such as the priority of the request. For example, if the request is related to a real-time task that has a high priority, a buffer cell associated with a high priority may be identified.

Once the available buffer cell is identified, the request is packed at act 430, with all the necessary data associated with the request, into the identified available buffer cell in the first buffer. After the request is sent to the first buffer, the thread that issues the request from the first group may wait for the response by examining the buffered responses 160 in the second buffer. The examination may be performed on a regular basis such as every 10 milliseconds or it may be performed whenever the thread is idle. The implementation may be thread dependent.

When a thread from the first group enters an examination mode for responses, it may first check, at act 440, to see whether there are any response in the second buffer 140. If there is no response buffered in the second buffer, the thread continues its processing at act 450. If there are responses buffered in the second buffer, the thread may examine, at act 460, each response across all the responses buffered in the second buffer to see if next response is relevant. The relevance may be defined based on recipient's name or other measures. If a relevant response is identified, the thread processes the response at act 470. For example, if a user interface thread from the first group accepts a user command to pin a device and issues the corresponding request to a worker thread in the second group to pin the device, the response may be returned by the worker thread with a response flag and an identification. In this case, the user interface thread may display the returned message in a window to the user. If no relevant response is identified, the thread continues its processing at act 450.

Figure 5:
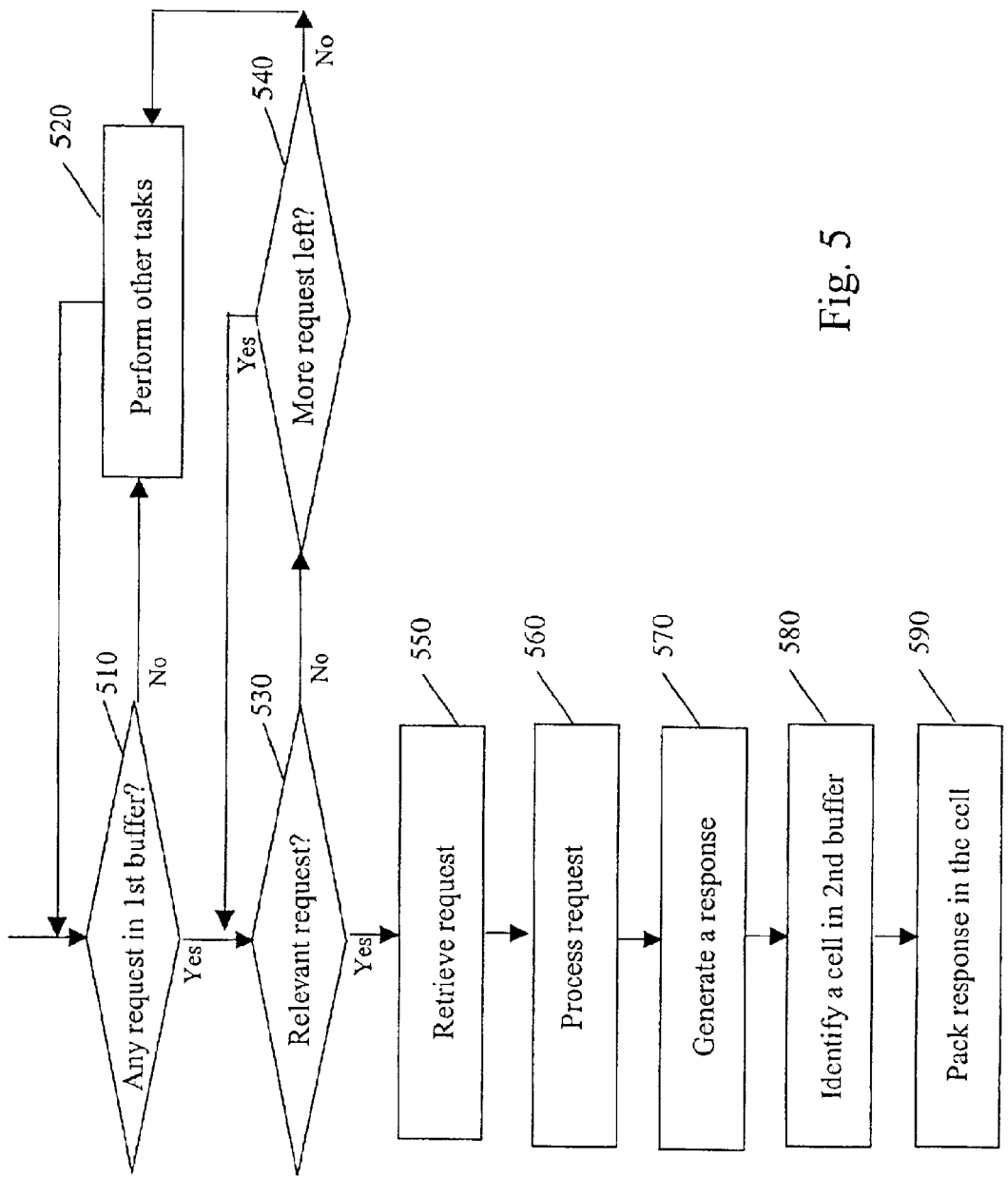
FIG. 5 is an exemplary flowchart of a worker thread.

FIG. 5 is an exemplary flowchart of a process, in which a service thread from the second group 130 communicates with a thread in the first group 110 via two buffers. A service thread from the second group first checks, at act 510, whether there is any request in the first buffer 120. If there is no buffered request, the thread from the second group may perform other tasks at act 520 before it goes back to act 510 to check again. If there are requests buffered in the first buffer 120, the service thread may examine each request, through acts 530 and 540, to see whether it is a relevant request. The relevance here may be determined based on a recipient's identification or whether the request asks for a service that can be performed by the service thread. If there is no relevant request is identified, the service thread may continue other tasks at act 520.

When a relevant request is found, determined at act 530, the service thread proceeds to act 550 and 560 to retrieve and to process the request. The processing may include performing the operations that the request asks. During performing the operation, the service thread may generate, at act 570, a response as a return message to the thread that generates the request. To deliver the response back to the first group of thread, the service thread identifies, at act 580, an available buffer cell in the second buffer 140 and then packs, at act 590, the return response in the available buffer cell in the second buffer.

The processing described above may be performed by a general-purpose computer alone or in connection with a special purpose computer. Such processing may be performed by a single platform or by a distributed processing platform. In addition, such processing and functionality can be implemented in the form of special purpose hardware or in the form of software being run by a general-purpose computer. Any data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and, materials, such as are within the scope of the appended claims.

What is claimed is:

1. A system for inter-thread communications, comprising:
   at least one thread from a first group of threads;
   a first buffer for buffering a request from the at least one thread from the first group;
   at least one thread from a second group of threads for performing an operation according to the request retrieved from the first buffer according to a predetermined criterion, the at least one thread from the first group of threads not being informed as to which of the second group of threads performs the operation; and
   a second buffer for buffering a response with respect to the request, the response being generated by the at least one thread from the second group, the response being retrieved by a thread from the first group.

2. The system according to claim 1, wherein the first group of threads includes a user interface thread.

3. The system according to claim 1, wherein the second group of threads includes a worker thread.

4. The system of claim 1, wherein the response is retrieved by the at least one thread from the first group of threads.

5. The system of claim 1, wherein the response is retrieved by a different at least one thread, other than the thread from the first group of threads.

6. The system of claim 1, wherein the first buffer buffers the request in a buffer cell according to a priority of the request.

7. A method for inter-thread communications, comprising:
   sending, by a thread from a first group of at least one thread, a request to a first buffer;
   retrieving, by a thread from a second group of threads, the request from the first buffer according to a predetermined criterion;
   processing the request by the thread from the second group of threads, the at least one from the first group of threads not being informed as to which of the second group of threads performs the operation;
   sending, by the thread from the second group, a response with respect to the request to a second buffer after the processing; and
   receiving, by a thread from the first group, the response from the second buffer according to a second predetermined criterion.

8. The method according to claim 7, wherein the first group includes a user interface thread; and
   the second group includes a worker thread.

9. The method according to claim 7, wherein retrieving the request by a thread from the second group according to a predetermined criterion includes retrieving according to whether the thread from the second group can perform the operation requested by the request.

10. The method according to claim 7, wherein the receiving the response by a thread from the first group of thread according to a second predetermined criterion includes receiving according to whether the response is addressed to the thread from the first group of threads.

11. A computer-readable medium having program code stored therein for causing, when executed, inter-thread communications to occur comprising:
   sending, by at least one thread from a first group of threads, a request to a first buffer;
   retrieving, by a thread from a second group of threads, the request from the first buffer according to a predetermined criterion;
   processing the request by the thread from the second group of threads, the at least one thread from the first group of threads not being informed as to which of the second group of threads perform the operation;
   sending, by the thread from the second group, a response with respect to the request to a second buffer after the processing; and
   receiving, by a thread from the first group of threads, the response from the second buffer according to a second predetermined criterion.

12. The medium according to claim 11, wherein the first group of threads includes a user interface thread; and
   the second group of threads includes a worker thread.

13. The medium according to claim 11, wherein retrieving the request by a thread from the second group of threads according to a predetermined criterion includes retrieving according to whether the thread from the second group can perform the operation requested by the request.

14. The medium according to claim 11, wherein the receiving the response by a thread from the first group of threads according to a second predetermined criterion includes receiving according to whether the response is addressed to the thread from the first group of threads.

15. A system for inter-thread communications, comprising:
   at least one thread from a first group of threads;
   a first buffer for buffering a request from the at least one thread from the first group;
   at least one thread from a second group of threads for performing an operation according to the request retrieved from the first buffer, each of the second group of threads examining the request to determine if said each of said second group of threads can process the request; and
   a second buffer for buffering a response with respect to the request, the response being generated by the at least one thread from the second group, the response being retrieved by a thread from the first group.

16. The system of claim 15, wherein the first group of threads manages storing the request in the first buffer and the second group of threads manages storing the response in the second buffer.

17. A method for inter-thread communications, comprising:
   sending, by a thread from a first group of threads, a request to a first buffer;
   retrieving, by a thread from a second group of threads, the request from the first buffer according to a predetermined criterion, each of the second group of threads examining the request to determine if said each of said second group of threads can process the request;
   processing the request by the thread from the second group of threads;
   sending, by the thread from the second group, a response with respect to the request to a second buffer after the processing; and
   receiving, by a thread from the first group, the response from the second buffer according to a second predetermined criterion.

18. The method of claim 17, wherein the first group of threads manages storing the request in the first buffer and the second group of threads manages storing the response in the second buffer.

19. A computer-readable medium encoded with a program of a thread for inter-communication, the program, when executed, causing:
   sending, by a thread from a first group of threads, a request to a first buffer;
   retrieving, by a thread from a second group of threads, the request from the first buffer according to a predetermined criterion, each of the second group of threads examining the request to determine if said each of said second group of threads can process the request;
   processing the request by the thread from the second group of threads;
   sending, by the thread from the second group, a response with respect to the request to a second buffer after the processing; and
   receiving, by a thread from the first group, the response from the second buffer according to a second predetermined criterion.

20. The medium of claim 19, wherein the first group of threads manages storing the request in the first buffer and the second group of threads manages storing the response in the second buffer.

* * * * *